Aug. 6, 1968
H. W. BAKER
3,396,001
METHODS OF AND APPARATUS FOR TOUGHENING SHEETS
OF GLASS WITH A RESERVE ZONE
Filed Feb. 11, 1965
3 Sheets-Sheet 1
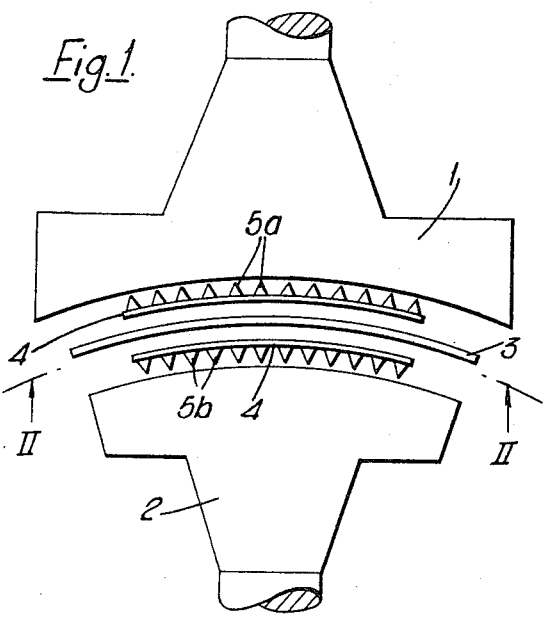
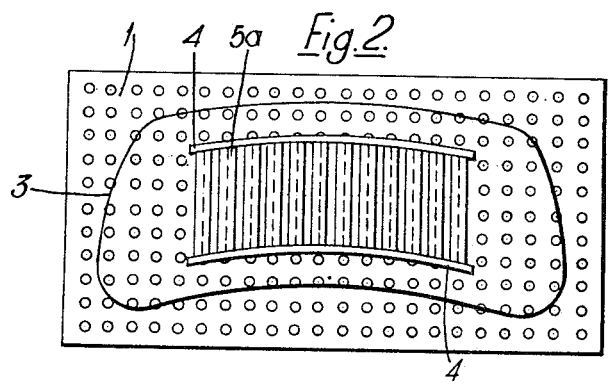
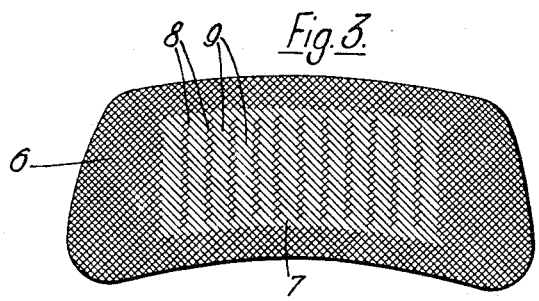
Henry Chellstood Baker
By Morrison, Kennedy & Campbell Attorneys

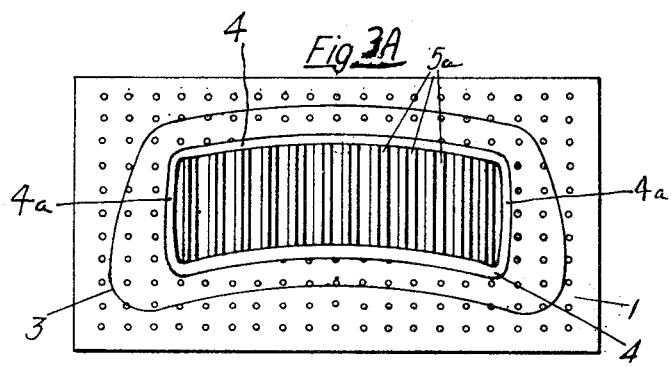

# United States Patent Office 3,396,001
Patented Aug. 6, 1968

3,396,001
METHODS OF AND APPARATUS FOR TOUGHENING SHEETS OF GLASS WITH A RESERVE ZONE
Henry Wellstood Baker, Birmingham, England, assignor to Pilkington Brothers Limited, Liverpool, England, a corporation of Great Britain
Filed Feb. 11, 1965, Ser. No. 431,797
Claims priority, application Great Britain, Feb. 12, 1964, 5,941/64
4 Claims. (Cl. 65—115)

ABSTRACT OF THE DISCLOSURE

Methods and apparatus for selectively toughening glass to leave selected vision areas when the glass is shattered wherein there are interposed in the path of a gaseous chilling medium directed uniformly toward the faces of a uniformly heated glass sheet for windshields, outer elements extending generally in the direction of the longer edges of the sheet, outer elements connecting the same, and spaced interior strips also connecting the same and alternately intercepting the chilling medium to provide a vision zone.

---

Figure 4:
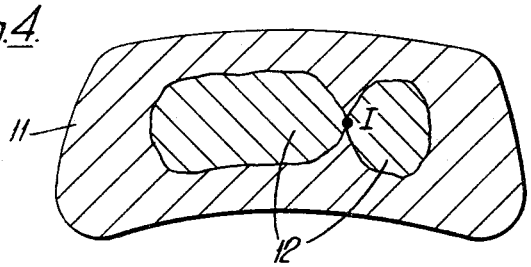

This invention relates to methods of and apparatus for toughening sheets of glass such as are used, for example as automobile windscreens.

It is known to toughen sheets of glass so that when the glass is fractured, the presence of sharp and jagged edges of glass is avoided. It is also known to produce in a toughened glass sheet for use, for example as the windscreen of an automobile, areas of glass having different degrees of toughening so that, when the sheet of glass is fractured, a proportion of the glass will contain larger particles, which will give a better visibility than the visibility obtainable through the fracture particles formed in a highly toughened glass sheet.

It is a main object of the present invention to provide a new and improved toughened glass sheet which is so toughened as to permit good visibility to the driver when the sheet is fractured during use as a windscreen.

According to the present invention, there is provided a sheet of toughened glass, for example for an automobile windscreen, comprising peripheral regions toughened to a first degree of toughening, demarcation regions contiguous with the said peripheral regions and toughened to a lesser degree than the said first degree of toughening, and, within said demarcation regions, one or more selected areas, each selected area comprising alternate regions of glass toughened to different degrees, whereby when the sheet of glass is fractured each selected area persists as a vision zone.

The first degree of toughening, which is the degree of toughening imparted to the peripheral regions of the glass sheet, is such as to produce a fine fragmentation when the sheet of toughened glass is fractured, and the fracture will generally produce a particle count in excess of 20 particles per square inch in glass toughened to the said first degree of toughening.

Desirably, however, the peripheral region is a continuous peripheral region extending around the whole periphery of the glass sheet, and the first degree of toughening is present in the whole of this continuous peripheral region. According to this aspect, therefore, the present invention provides a sheet of toughened glass, for example for an automobile windscreen, comprising a continuous peripheral region toughened to a first degree of toughening, demarcation regions contiguous with opposed parts of said continuous peripheral region and toughened to a lesser degree than the said first degree of toughening, and an inner area consisting of one or more selected areas, each of which comprises alternate regions of glass toughened to different degree, whereby, when the sheet of glass is fractured, the said selected areas persist as one or more vision zones.

Advantageously the demarcation regions extend in contiguity with the peripheral region around the whole inner boundary of the peripheral region so that there is in the toughened glass sheet an annular demarcation region of a lesser degree of toughening than the said first degree of toughening present in the said continuous peripheral region.

According to this aspect, therefore, the present invention provides a sheet of toughened glass, for example for an automobile windscreen, comprising a continuous peripheral region toughened to a first dgree of toughening, an annular demarcation region contiguous with the said continuous peripheral region and toughened to a lesser degree than the said first degree of toughening and, within said annular demarcation region, a central area of the glass sheet comprising alternate strips of glass toughened to different degrees, the glass in the less toughened strips of said alternate strips being toughened to a degree less than said first degree of toughening, whereby, when the sheet of glass is fractured, the central area persists as a vision zone including also the said annular demarcation region.

In this embodiment of the invention, the toughened glass sheet consists effectively of three parts only, the outer peripheral region, which is highly toughened, the annular demarcation zone, which is toughened to a lesser degree, and the central area, which is made up of alternate regions of glass which are toughened to relatively high and low degrees. Effectively the annular demarcation zone adds to the size of the vision zone, the greater part of which is the central area comprising the alternate regions of glass which are toughened to relatively high and low degrees.

The present invention further comprehends a method of producing a sheet of toughened glass having a selected area intended to form a vision zone comprising the steps of exposing a heated glass sheet to the action of a quenching medium simultaneously and uniformly directed to both faces of the glass sheet, and interposing in the path of the gaseous chilling medium directed at one or both faces of the glass sheet at least a pair of members disposed substantially parallel to the major edges of the glass sheet to interrupt the flow of the gaseous chilling medium and define demarcation regions spaced from the major edges of the glass sheet and substantially parallel therewith, and interposing in the path of the gaseous chilling medium between the said two members a further series of spaced members to interrupt the flow of the gaseous chilling medium towards a central area of the glass sheet so that there are formed, in the glass sheet in the central area between the demarcation regions, alternate regions of glass toughened to a lesser degree than the remaining glass between the said regions.

As already indicated, although the regions of glass in the central area of the glass sheet may be of other shapes, they are preferably strips of glass which have been toughened to different degrees. Such a preferred toughening pattern in the central area of the glass sheet is conveniently produced by interposing a series of spaced apart strip-like members in the path of the gaseous chilling medium. Desirably the strips of glass toughened to different degrees are parallel with the shorter dimension of the central area of the glass sheet, but the invention is not limited to such an arrangement.

According to this aspect, therefore, the present invention provides a method of producing a sheet of toughened glass having a substantially central area intended to form a vision zone, comprising the steps of exposing a heated glass sheet to the action of a quenching medium simultaneously directed to both faces of the glass sheet, and interposing in the path of the gaseous chilling medium directed at one or both faces of the glass sheet, an annular member and a series of spaced apart strip-like members, disposed within the area defined by the annulus, to interrupt the flow of the gaseous chilling medium and define in the toughened glass sheet an annular demarcation region toughened to a lesser degree than the surrounding peripheral region of the glass sheet, said annular demarcation region in turn surrounding a central area of the glass sheet comprising alternate strips of glass toughened to different degrees, whereby, when the sheet of glass is fractured, the central area persists as a vision zone.

The present invention still further comprehends apparatus for toughening a glass sheet, comprising quenching means for directing a gaseous chilling medium onto the surfaces of a heated glass sheet, supporting means for supporting a heated glass sheet in position for quenching by said quenching means, an annular member disposed between the quenching means and the position occupied by one surface of the glass sheet during quenching, and a series of members having a width small in comparison with the length of the glass sheet and positioned in the area defined by the inner edge of said annulus so that there is formed in the toughened glass sheet a central area having a stress pattern comprising regions of glass which are less toughened than the regions of glass therebetween, and a demarcation zone defining the boundary of said central area, the demarcation zone having a lesser degree of toughening than the glass in the surrounding peripheral region of the glass sheet.

More particularly according to this aspect, the present invention provides apparatus for toughening a glass sheet, comprising opposed quenching means for directing a gaseous chilling medium onto the surface of heated glass sheet, supporting means for supporting a heated glass sheet in position for quenching, and, disposed between each of the quenching means and a surface of a supported glass sheet, an annular metal frame carrying a series of parallel strip-like members extending between opposite sides of the frame, each strip-like member in one series being directly opposed to the corresponding member in the other series, whereby the flow of the gaseous chilling medium towards the surfaces of the glass sheet is interrupted in corresponding patterns on each surface and there is formed in the toughened glass sheet a central area having a stress pattern comprising alternate strips of glass toughened to different degrees and an annular demarcation region surrounding the central area, the said annular region being toughened to a lesser degree than the surrounding peripheral region of the glass sheet.

Figure 5:
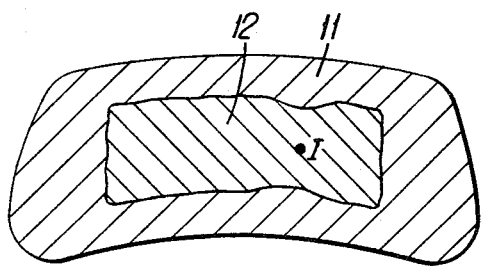
Figure 6:
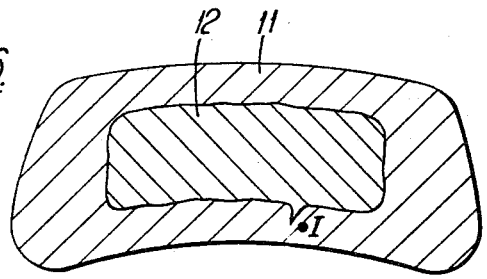

In order that the invention may be more clearly understood, there will be described a preferred embodiment thereof, which is given purely by way of example, the description being made with reference to the accompanying diagrammatic drawings, in which:

FIGURE 1 is a plan view of apparatus according to the invention,

FIGURE 2 is a view of the apparatus according to FIGURE 1, including a heated glass sheet, the view being taken along the line II—II of FIGURE 1, FIGURE 3 shows a glass sheet toughened using the apparatus of FIGURES 1 and 2, and indicates the areas of the glass sheet which will have the different degrees of toughening, FIGURE 3A is a view corresponding to FIGURE 2, showing a modified form of the apparatus, and FIGURES 4 to 7 are idealised diagrammatic representations of fractured windscreens showing the areas which persist as a vision zone, and the areas which are comparatively opaque, FIGURES 4 and 6 being comparative figures.

In the drawings, like reference numerals designate the same or similar parts.

In the drawings, referring more particularly to FIGURES 1 and 2, there are shown opposed quenching units comprising air boxes 1 and 2 having their faces curved to conform with the curvature of a bent glass sheet 3 to be toughened between them. As indicated in FIGURE 2, the surfaces of the air boxes facing the glass sheet contain a considerable number of perforations or nozzles, so that cold air may issue therefrom towards the uniformly heated glass sheet 3. Means, not shown, are provided for giving the air boxes a linear or circular movement of small amplitude in the mean plane of their opposed surfaces so as to distribute the cooling effect of the air jets over the surfaces of the glass in known manner.

Interposed between the perforated faces of the air boxes 1 and 2 and the glass sheet 3 are two pairs of metal bars 4, each carrying a respective series of opposed strip-like members comprised by angle bars 5a and 5b. The angle bars are comprised of metal $\frac{1}{16}''$ thick, the two arms of the bar forming the angle being each about 1¼ inches in length and being angled to give a base length of approximately 1 inch to the triangle defined by each angle bar 5a and 5b. The angle bars 5a and 5b are mounted on the frame structure constituted by the bars 4, so that there is a gap of approximately ½-inch between the nearest parts of adjacent angles bars 5a or 5b, and the whole arrangement is so arranged that the nearest points of the angle bars 5a and 5b and the bars 4, to the glass sheet are of the order of ⅛-inch from the nearest surface of the glass sheet which is suspended therebetween on supporting means such as tongs (not shown in the drawings). For clearness of illustration the top and bottom bars 4 are shown in FIGURE 2 with a flat cross-section, but they are preferably of the same cross-section as the strip-like members 5a and 5b, and are conveniently made by fixing top and bottom horizontal members adjacent vertical members. The bars 4 and the respective strip-like members 5a and 5b are arranged to be opposed to each other across the glass sheet.

Air at ambient temperature is forced by fans into the air boxes 1 and 2 at a pressure of about 10" to 12" water-gauge, and the flow of the gaseous chilling air from the air boxes 1 and 2 towards the central part of the uniformly heated glass sheet 3 positioned between the air boxes is interrupted by deflection of the chilling air by the angle bars 5a, 5b. Also the chilling air directed at the portions of the glass sheet 3 shielded by the bars 4 is interrupted, and there are consequently formed in the glass sheet corresponding to the position of the bars 4 a demarcation zone having a lesser degree of toughening than the peripheral region of the glass sheet, and, within the demarcation zone, a central area having strip-like regions of glass toughened alternately to a higher and lower degree.

A glass sheet toughened using the apparatus of FIGURES 1 and 2 is illustrated in FIGURE 3 of the accompanying drawings. The glass sheet comprises a peripheral region 6 toughened to a first degree of toughening so that on fracture there will be in the continuous peripheral region 6 approximately 20 particles per square inch. Within the peripheral region 6 there is an annular demarcation zone 7 which separates the peripheral region from a central area which latter contains alternate strips of higher and lower degrees of toughening.

The annular demarcation zone 7 yields on fracture of the glass sheet particles up to but not generally exceeding 1 square inch in area. The central area is made up of alternate strips 8 and 9, the strips 8 being toughened to an extent to give, on fracture, particles compatible with a particle count in excess of about 15 per square inch, while the degree of toughening in the strips 9 is of a similar order to the degree of toughening in the annular demarcation region 7.

The annular demarcation zone 7 and the central area comprising the alternate strips 8 and 9 together comprise the effective vision zone in the fractured glass sheet 3 in accordance with the present invention.

Although the strip-like regions 8 and 9 in the central area have been shown in FIGURE 3 as being of similar widths, it will be understood that one strip may be made wider than the other, as desired, by suitable variation of the interposing members, that is to say the angle bars 5.

The bars 4 may be extended along the sides of the viewing zone so as to frame the latter, as illustrated at 4 and 4a in FIGURE 3A, and in the tempered sheet produce a continuous demarcation zone which surrounds the vision zone and separates the latter from the peripheral region.

If desired, the spaces between the angle bars 5 may be partially obstructed by a wire gauze, for example there may be secured to the annular frame 4 and the angle bars 5 a sheet of metal gauze of 32 S.W.G. wire woven 30 to the inch.

The present invention provides a glass sheet which will give an improved form of fracture pattern as compared with the methods of toughening glass sheets which are described in our copending patent applications Nos. 23,259/63 and 5,943/64.

The demarcation regions of glass toughened to a lesser extent than the glass in the peripheral regions of the glass sheet in accordance with the present invention do provide a line of demarcation between the central area of the glass sheet and the peripheral regions. These demarcation regions, which, in the embodiment of FIGURE 3 of the accompanying drawings, join up to form the annular demarcation region 7, provide the advantage that they act to maintain the shape of the selected area or areas which constitute the vision zone or zones, and they tend to prevent encroachment into the vision zone from the peripheral region of areas of fine fracture which are virtually opaque.

Figure 7:
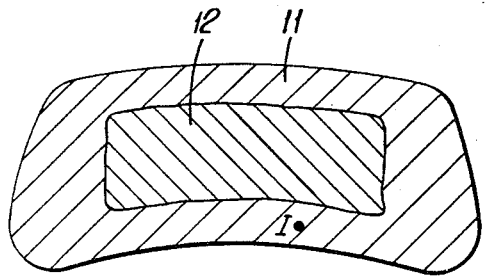

The shape of the areas of coarse and fine fracture in a glass sheet having zones toughened to different degrees tend to vary according to the point at which the fracture is initiated. In particular, the shape of the areas of course and fine fracture have been found to vary, depending on whether the fracture is initiated within the vision zone or in a peripheral region of highly toughened glass. The improved result obtained by the use of a glass sheet toughened using the apparatus illustrated in FIGURES 1 and 2 as compared with a glass sheet toughened using the same apparatus including the strip-like members 5a and 5b, but excluding the frame 4 is illustrated in FIGURES 4 to 7 of the accompanying drawings. These figures are generalised impressions of the fracture patterns obtained, and FIGURES 4 and 5 illustrate the areas of course and fine fracture obtained when the fracture is initiated at a point within the vision zone, and FIGURES 6 and 7 indicate also areas of coarse and fine fracture, but when the fracture is initiated at a point in the highly toughened peripheral region. FIGURES 5 and 7 illustrate the areas of coarse and fine fracture obtained when it is the glass sheet in accordance with the preferred embodiment of the present invention which is fractured, and FIGURES 4 and 6 illustrate the areas of coarse and fine fracture obtained when a glass sheet toughened using only the strip-like members 5a and 5b is fractured.

In FIGURES 4 to 7 the areas of fine fracture which are virtually opaque are indicated by the reference numeral 11, and the areas which constitute the vision zone or zones are denoted by the reference numeral 12. In each figure, the point I denotes the point at which the fracture is initiated.

It will be observed that the encroachments of the fan-shaped areas of fine fracture right into the intended vision zone in FIGURE 4 could reduce the view of the driver of a vehicle to a very dangerous extent. On the other hand, the general area of the vision zone is substantially maintained, wherever the point of initiation of the fracture, in a preferred windscreen according to the present invention and as illustrated in FIGURES 5 and 7.

It will be understood that the areas denoted by the reference numeral 12, which are the vision zones in each of FIGURES 4 to 7, will in fact be comprised of areas respectively of large and small particles as indicated in more detail in FIGURE 3 of the accompanying drawings. The areas of small particles interspersed in the areas of large particles merge with these areas of large particles to form an effective vision zone.

It will have been understood from this specification that when reference is made to an "annular demarcation region" or an "annular frame," the demarcation region or frame is effectively a closed loop defined by lines whose projection may have any shape, for example circular, oval, rectangular or trapezoidal or modifications thereof.

It has already been stated in the specification that the annular frame need not be made in one piece, but could be made from separate horizontal and vertical members. In general the ends of the vertical members will be adjacent to the sides of the horizontal members, but a smallish gap between the ends of the vertical members and the nearest sides of the horizontal members is permissible within the definition of "annular frame" provided that a substantially closed area of glass is protected from the action of the chilling medium.

I claim:

1. A method of producing a sheet of toughened glass having a selected area intended to form a vision zone, which comprises uniformly heating a sheet of glass for a different toughening thereof in different areas, aligning the glass sheet and, on each side thereof, a deflector disposed interiorly of the periphery of the sheet and having deflecting means in the form of an outer annular zone and inner generally-parallel transverse spaced-apart deflecting strips merging at their ends with the annular deflecting zone, and simultaneously directing a gaseous chilling medium towards and against said deflectors and said glass sheet until a different degree of toughening of the glass is effected in an annular area of the glass corresponding to said outer annular zone and parallel transverse areas corresponding to said spaced-apart strips on the one hand, and the peripheral area of said sheet and other transverse areas corresponding to the transverse spaces between said strips on the other hand, each of said areas being of substantial width to provide a sheet which is relatively highly toughened at said peripheral area and at transverse areas unconnected therewith and is relatively less toughened to provide on fracture a vision zone of significant visibility at said annular area and said parallel transverse areas connecting therewith.

2. Apparatus for producing a sheet of toughened glass having a selected area intended to form a vision zone, which comprises means for uniformly heating a sheet of glass for different toughening in different areas, a pair of deflectors each having an outer annular deflecting means and inner generally-parallel transverse spaced-apart deflecting strips merging at their ends with the annular deflecting means, means for aligning a glass sheet and, on each side thereof, one of said deflectors with the glass sheet extending peripherally of said deflectors, and means for simultaneously directing a gaseous chilling medium towards and against said deflectors and said glass sheet until a different degree of toughening of the glass is effected in the areas of the glass corresponding to said outer annular means and said parallel spaced-apart strips of the deflecting means on the one hand, and the peripheral area of said sheet and the areas corresponding to the transverse spaces between said strips on the other hand, each of said areas being of substantial width to provide a sheet which is relatively highly toughened at said peripheral area and at transverse areas unconnected therewith and is relatively less toughened to provide on fracture a vision zone of significant visibility in said annular area and said parallel transverse areas connecting therewith.

3. Apparatus as in claim 2 wherein each of said deflectors comprises a deflecting band composed of a pair of horizontal portions and a pair of transverse connecting vertical portions and wherein said parallel transverse strips are within said band.

4. Apparatus as in claim 2 wherein each of said deflectors comprises a pair of horizontal bars connected only by said parallel transverse strips the end ones of which provide, with said horizontal bars, said annular deflecting means.

References Cited

UNITED STATES PATENTS

| | | | |
|---|---|---|---|
| 3,174,840 | 3/1965 | Long | 65—115 |
| 3,186,815 | 6/1965 | Jochim | 65—115 |
| 3,304,166 | 2/1967 | Bolland. | |

DONALL H. SYLVESTER, *Primary Examiner.*

ARTHUR D. KELLOGG, *Assistant Examiner.*